(12) United States Patent
Yan

(10) Patent No.: US 12,216,322 B2
(45) Date of Patent: Feb. 4, 2025

(54) UNIVERSALLY ADJUSTABLE PRECISION LEVER STRUCTURE AND PHOTOELECTRIC PRODUCT

(71) Applicant: Ningbo AceHawky Outdoor Products Technology Co., Ltd., Ningbo (CN)

(72) Inventor: Xinmei Yan, Ningbo (CN)

(73) Assignee: Ningbo AceHawky Outdoor Products Technology Co., Ltd., Ningbo (CN)

( * ) Notice: Subject to any disclaimer, the term of this patent is extended or adjusted under 35 U.S.C. 154(b) by 888 days.

(21) Appl. No.: 17/365,580

(22) Filed: Jul. 1, 2021

(65) Prior Publication Data
US 2022/0299727 A1   Sep. 22, 2022

(30) Foreign Application Priority Data
Mar. 22, 2021   (CN) .......................... 202120584487.8

(51) Int. Cl.
*G02B 7/00* (2021.01)
(52) U.S. Cl.
CPC ...................................... *G02B 7/00* (2013.01)

(58) Field of Classification Search
CPC .......... G02B 7/00; G02B 7/003; G02B 7/001; G02B 7/002; G02B 7/004; G02B 7/005; G02B 7/008; G02B 7/02; G03B 30/00
USPC ......................................................... 359/811
See application file for complete search history.

(56) References Cited

U.S. PATENT DOCUMENTS

2009/0225558 A1 * 9/2009 Atkinson .............. E05D 11/087
16/342

* cited by examiner

*Primary Examiner* — Henry Duong

(57) ABSTRACT

An universally adjustable precision lever structure is provided. The universally adjustable precision lever structure includes: a double spherical head lever arm, an elastic member, a linear adjusting assembly and an universal connecting assembly. In a particular use process, the double spherical head lever arm uses a center of an annular spherical surface of the universal connecting assembly as a fulcrum to realize universal rotation under an action of the linear adjusting assembly.

11 Claims, 2 Drawing Sheets

UNIVERSALLY ADJUSTABLE PRECISION LEVER STRUCTURE AND PHOTOELECTRIC PRODUCT

CROSS REFERENCE TO RELATED APPLICATION

This patent application claims the benefit and priority of Chinese Patent Application No. 202120584487.8 filed on Mar. 22, 2021, the disclosure of which is incorporated by reference herein in its entirety as part of the present application.

TECHNICAL FIELD

The present disclosure relates to the field of optical instrument adjustment technologies, and in particular, to an universally adjustable precision lever structure and a photoelectric product.

BACKGROUND ART

Currently, an optical axis adjustment or an instruction adjustment of a luminous column in many photoelectric products generally has a limited range of cone, which leads to a small adjustment range of the optical axis adjustment or the instruction adjustment of the luminous column. With a development of scientific technologies, people have higher and higher requirements for the adjustment range of the optical axis adjustment or the adjustment range of the instruction adjustment of the luminous column. Therefore, there is a problem to be solved by a person skilled in the art at present that how to widen a range of the optical axis adjustment or a range of the indication adjustment of the luminous column.

SUMMARY

In order to solve the above-mentioned technical problem, the present disclosure provides an universally adjustable precision lever structure and a photoelectric product, so as to widen a range of an optical axis adjustment or a range of an indication adjustment of a luminous column.

To achieve the above-mentioned purpose, the present disclosure provides the following solutions.

The present disclosure provides an universally adjustable precision lever structure, which includes: a double spherical head lever arm, an elastic member, a linear adjusting assembly and an universal connecting assembly. The double spherical head lever arm includes a hollow arm body, a small spherical head sleeve and a large spherical head sleeve arranged coaxially. The small spherical head sleeve and the large spherical head sleeve are respectively arranged at and communicate with two ends of the hollow arm body. The linear adjusting assembly includes multiple linear adjusting mechanisms configured for adjusting a position of the small spherical head sleeve along a linear direction. An end of the elastic member and ends of the multiple linear adjusting mechanisms are abutted against an outer surface of the small spherical head sleeve. The elastic member and the multiple linear adjusting mechanisms are arranged along a circumferential direction of the small spherical head sleeve. A resultant force of the multiple of linear adjusting mechanisms is collinear with an elastic force of the elastic member. The universal connecting assembly includes an universal connecting ring and multiple positioning balls. An inner wall of the universal connecting ring is provided with an annular spherical surface matching the large spherical head sleeve. The large spherical head sleeve is inserted in an inside of the universal connecting ring and fitted with the annular spherical surface. The universal connecting ring is circumferentially provided with a plurality of positioning holes corresponding to the plurality of positioning balls one by one. Each of the multiple positioning balls is respectively inserted in a corresponding one of the multiple positioning holes. And the multiple positioning balls are arranged to abut against an outer surface of the large spherical head sleeve.

In some embodiments, the multiple linear adjusting mechanisms may comprise two linear adjusting mechanisms. The elastic member and two linear adjusting mechanisms may be arranged along a radial direction of the small spherical head sleeve. The two linear adjusting mechanisms may be perpendicular to each other. And an angle between the elastic member and each of the two linear adjusting mechanisms may be 135 degrees In some embodiments, the multiple linear adjusting mechanisms may be adjusting screws.

In some embodiments, the elastic member may be a spring.

In some embodiments, a number of the multiple positioning balls may be greater than or equal to 6 and less than or equal to 20, and the number of the multiple positioning balls may be an even number.

The present disclosure further provides a photoelectric product, which includes a mounting shell and the universally adjustable precision lever structure. The universally adjustable precision lever structure is arranged in the mounting shell. A first mounting hole and multiple second mounting holes are circumferentially arranged in an inner wall of the mounting shell. The elastic member is arranged in the first mounting hole. The multiple second mounting holes correspond to the multiple linear adjusting mechanisms one by one. And each of the multiple linear adjusting mechanisms is arranged in a corresponding one of the multiple second mounting holes.

In some embodiments, the photoelectric product further may include a limiting pressure ring. A first limiting step configured for positioning the universal connecting ring and a second limiting step configured for positioning the limiting pressure ring may be arranged at an end of the mounting shell that is close to the large spherical head sleeve. The first limiting step and the second limiting step may be arranged in a stepped manner. A first end of the universal connecting ring may be arranged to be opposite to the first limiting step. A second end of the universal connecting ring may be arranged to abut against the limiting pressure ring, and an end of the limiting pressure ring that is close to the universal connecting ring may be arranged to be opposite to the second limiting step.

Compared with the conventional art, the embodiments have the following technical effects.

The universally adjustable precision lever structure provided by the present disclosure includes a double spherical head lever arm, an elastic member, a linear adjusting assembly and an universal connecting assembly. The double spherical head lever arm includes a hollow arm body, a small spherical head sleeve and a large spherical head sleeve arranged coaxially. The small spherical head sleeve and the large spherical head sleeve are respectively arranged at two ends of the hollow arm body and respectively communicate with two ends of the hollow arm body. The linear adjusting assembly includes multiple linear adjusting mechanisms configured for adjusting a position of the small spherical head sleeve along a linear direction. An end of the elastic member and ends the multiple linear adjusting mechanisms abut against an outer surface of the small spherical head sleeve. The elastic member and the multiple linear adjusting mechanisms are arranged along a circumferential direction of the small spherical head sleeve. A resultant force of the multiple linear adjusting mechanisms is collinear with an elastic force of the elastic member. The universal connecting assembly includes an universal connecting ring and multiple positioning balls. An inner wall of the universal connecting ring is provided with an annular spherical surface matching the large spherical head sleeve. The large spherical head sleeve is inserted in an inside of the universal connecting ring and is fitted with the annular spherical surface. The universal connecting ring is circumferentially provided with multiple positioning holes corresponding to the multiple positioning balls one by one. Each of the multiple positioning balls is respectively inserted in a corresponding one of the multiple positioning holes. And the multiple positioning balls are arranged to abut against an outer surface of the large spherical head sleeve.

Optical lines of the photoelectric product pass through the large spherical head sleeve, the hollow arm body and the small spherical head sleeve in turn, so as to form an optical axis or a luminous column. In a particular usage process, the double spherical head lever arm uses a center of an annular spherical surface of the universal connecting ring as a fulcrum to realize universal rotation under an action of the multiple linear adjusting mechanisms. Compared with the conventional art in which only the optical axis or the luminous column can be adjusted within a limited range of cone, the universally adjustable precision lever structure provided by the embodiments can achieve that the universal adjustment of the optical axis or the luminous column, and thus the adjustment range is greatly widened.

BRIEF DESCRIPTION OF THE DRAWINGS

In order to more clearly illustrate the embodiments of the present disclosure or the technical solutions in the prior art, the drawings used in the embodiments will be briefly described below. It is apparent that the drawings in the following description are merely some embodiments of the present disclosure, and those skilled in the art can obtained other drawings according to the drawings without creative efforts.

Figure 1:
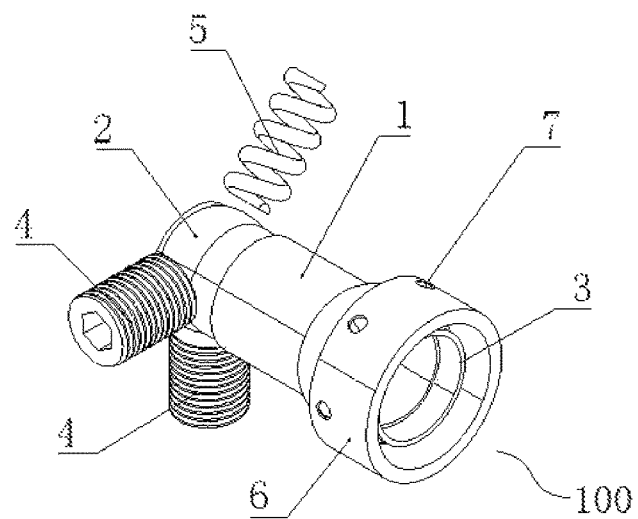
FIG. 1 is a schematic structural diagram of an universally adjustable precision lever structure according to an embodiment of the present disclosure.

List of the reference characters: 100 universally adjustable precision lever structure; 1 hollow arm body; 2 small spherical head sleeve; 3 large spherical head sleeve; 4 linear adjusting mechanism; 5 elastic member; 6 universal connecting ring; 7 positioning ball; 8 mounting shell; 9 first mounting hole; 10 second mounting hole; 11 first limiting step; 12 second limiting step; and 13 limiting pressure ring.

DETAILED DESCRIPTION OF THE EMBODIMENTS

The technical solutions in the embodiments of the present disclosure will be clearly and completely described below with reference to the drawings in the embodiments of the present disclosure. It is apparent that the described embodiments are only a part of the embodiments of the present disclosure, and not all of the embodiments. Based on the embodiments of the present disclosure, all other embodiments obtained by those skilled in the art without inventive efforts would fall within the protection scope of the present disclosure.

The embodiments aim to provide an universally adjustable precision lever structure and a photoelectric product which can widen an adjustment range of an optical axis adjustment or an adjustment range of an indication adjustment of a luminous column.

In order to make the above-mentioned objects, features and advantages of the present disclosure more comprehensible, the present disclosure will be further described in detail below with reference to the drawings and particular embodiments.

Figure 2:
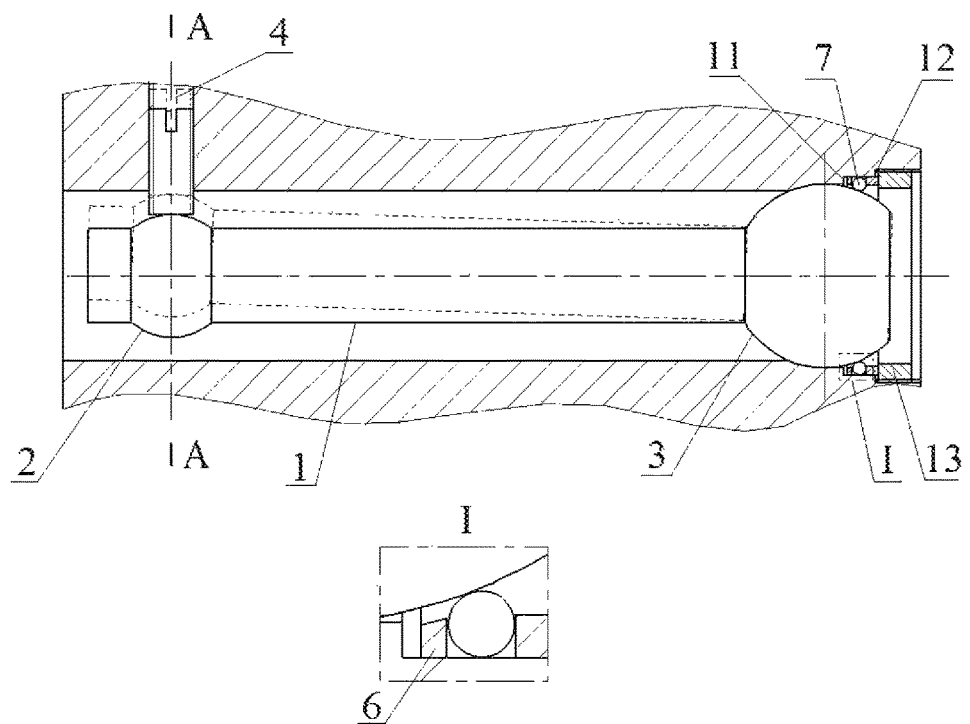
FIG. 2 is a cross-sectional view of a photoelectric product according to an embodiment of the present disclosure and an enlarged view of a region designed at I.
Figure 3:
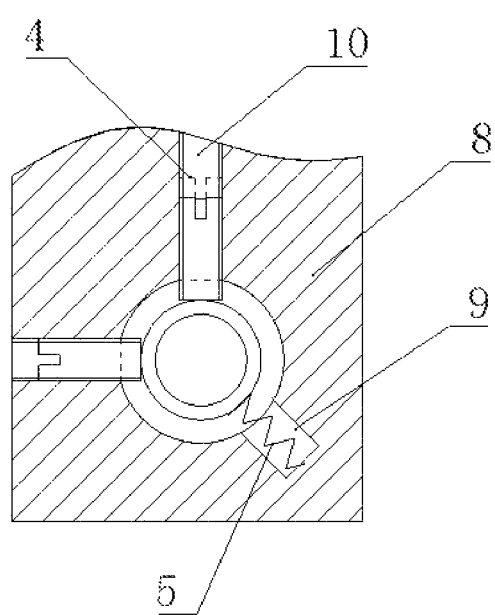
FIG. 3 is a cross-sectional view taken along line A-A of FIG. 2.

Referring to FIGS. 1-3, in the present embodiments, there is provided an universally adjustable precision lever structure 100, which includes: a double spherical head lever arm, an elastic member 5, a linear adjusting assembly and a universal connecting assembly. The double spherical head lever arm includes a hollow arm body 1, a small spherical head sleeve 2 and a large spherical head sleeve 3 arranged coaxially. And the small spherical head sleeve 2 and the large spherical head sleeve 3 are respectively arranged at two ends of the hollow arm body 1 and respectively communicate with two ends of the hollow arm body 1. The linear adjusting assembly includes multiple linear adjusting mechanisms 4 configured for adjusting a position of the small spherical head sleeve 2 along a linear direction. An end of the elastic member 5 and ends of the multiple linear adjusting mechanisms 4 are able to abut against an outer surface of the small spherical head sleeve 2. The elastic member 5 and the multiple linear adjusting mechanisms 4 are arranged along a circumferential direction of the small spherical head sleeve 2. A resultant force of the multiple linear adjusting mechanisms 4 is collinear with an elastic force of the elastic member 5. Under the resultant force applied by the multiple linear adjusting mechanisms 4 on the small spherical head sleeve 2, the elastic member 5 is elastically deformed and generates an elastic force equal to the resultant force of the linear adjustment mechanisms 4. The universal connecting assembly includes an universal connecting ring 6 and multiple positioning balls 7. An inner wall of the universal connecting ring 6 is provided with an annular spherical surface matching the large spherical head sleeve 3. The large spherical head sleeve 3 is inserted in an inside of the universal connecting ring 6, and is fitted with the annular spherical surface. The universal connecting ring 6 is circumferentially provided with multiple positioning holes corresponding to the plurality of positioning balls 7 one by one. Each of the multiple positioning balls 7 is inserted in a corresponding one of the multiple positioning holes. And the multiple positioning balls 7 are arranged to abut against an outer surface of the large spherical head sleeve 3.

Optical lines of the photoelectric product pass through the large spherical head sleeve 3, the hollow arm body 1 and the small bulb head sleeve 2 in turn, so as to form an optical axis or a luminous column. In a particular usage process, the double spherical head lever arm uses a center of an annular spherical surface of the universal connecting ring 6 as a fulcrum to realize universal rotation, under an action of the multiple linear adjusting mechanisms 4. Compared with the conventional art in which only the optical axis or the luminous column can be adjusted within a limited range of cone, the universally adjustable precision lever structure 100 provided by the embodiments can achieve that the universal adjustment of the optical axis or the luminous column, and thus the adjustment range is greatly widened.

In the present embodiment, the number of the multiple linear adjusting mechanisms 4 is two. The elastic member 5 and two linear adjusting mechanisms 4 are arranged along a radial direction of the small spherical head sleeve 2. The two linear adjusting mechanisms 4 are perpendicular to each other, and an angle between the elastic member 5 and each of the two linear adjusting mechanisms 4 is 135 degrees. In a particular usage process, each of the two linear adjusting mechanisms 4 adjusts a position of the small spherical head sleeve 2 along the radial direction of the small spherical head sleeve 2.

In the present embodiment, the multiple linear adjusting mechanisms 4 are adjusting screws.

In the present embodiment, the elastic member 5 is a spring.

In the present embodiment, the number of the multiple positioning balls is greater than or equal to 6 and less than or equal to 20, and the number of the multiple positioning balls is an even number. Further, the multiple positioning balls 7 are arranged uniformly in the circumferential direction of the universal connecting ring 6.

The present embodiment further provides a photoelectric product, which includes a mounting shell 8 and the universally adjustable precision lever structure 100. The universally adjustable precision lever structure 100 is arranged in the mounting shell 8. A first mounting hole 9 and a multiple second mounting holes 10 are circumferentially arranged on an inner wall of the mounting shell 8. The elastic member 5 is arranged in the first mounting hole 9, and the multiple second mounting holes 10 correspond to the multiple linear adjusting mechanisms 4 one by one. And each of the multiple linear adjusting mechanisms is arranged in a corresponding one of the multiple second mounting holes 10.

Correspondingly, when the multiple linear adjusting mechanisms 4 are adjusting screws, an inner wall of each of the multiple second mounting holes 10 is provided with an internal thread matching a corresponding one of the adjusting screws, and the adjusting screw is threadedly connected with the second mounting hole 10. In a particular usage process, with reference to FIGS. 2-3, a distance between each of the adjusting screws and the small spherical head sleeve 2 may be adjusted by rotating a corresponding one of the adjusting screws. After the adjusting screws are in contact with the outer surface of the small spherical head sleeve 2, the adjusting screws continue to be adjusted so that the adjusting screws apply a certain force on the outer surface of the small spherical head sleeve 2. The elastic member 5 is compressed under the force, and the double spherical head lever arm rotates, thereby realizing a position adjustment of the optical axis or the luminous column. It is noted that solid lines and dotted lines in FIG. 2 and FIG. 3 respectively representing the arrangement of the universally adjustable precision lever structure 100 provided by the embodiments before and after the adjustment.

The multiple linear adjusting mechanisms 4 are not limited to adjusting screws, but may also be linear telescopic structures, such as oil cylinders and air cylinders. When the linear telescopic structures are adopted, in a particular usage process, a certain force is applied to the outer surface of the small spherical head sleeve 2 by extending the linear telescopic structure, and the elastic member 5 is compressed by the force, so that the position adjustment of the optical axis or the luminous column is realized.

In the present embodiment, as shown in FIGS. 2-3, the photoelectric product further includes a limiting pressure ring 13. A first limiting step 11 configured for positioning the universal connecting ring 6 and a second limiting step 12 configured for positioning the limiting pressure ring 13 are arranged at an end of the mounting shell 8 that is close to the large spherical head sleeve 3. The first limiting step 11 and the second limiting step 12 are arranged in a stepped manner. A first end of the universal connecting ring 6 is arranged to be opposite to the first limiting step 11. A second end of the universal connecting ring 6 is arranged to abut against the limiting pressure ring 13. And an end of the limiting pressure ring 13 that is close to the universal connecting ring 6 is arranged opposite to the second limiting step 12. The limiting pressure ring 13 presses against the universal connecting ring 6, and the limiting pressure ring 13 cooperates with the first limiting step 11 to achieve an axial positioning of the universal connecting ring 6.

In the description of the present disclosure, it should be noted that "connection" should be understood broadly, for example, may be a fixed connection, may also be a detachable connection, or may be integrally connected, may be a mechanical connection or an electrical connection, may be a direct connection or an indirect connection via an intermediate medium, and may be a communication within two elements. For a person of ordinary skill in the art, the specific meanings of the above terms in the present disclosure can be understood specifically.

The principles and embodiments of the present disclosure are explained by using specific examples in the present specification, and the description of the above embodiments is only used to help understand the method and core idea of the present disclosure. Furthermore, for a person of ordinary skill in the art, according to the idea of the present disclosure, the specific embodiments and the application range may be changed. In summary, the contents of the present description should not be construed as limiting the present disclosure.

What is claimed is:

1. An universally adjustable precision lever structure, comprising: a double spherical head lever arm, an elastic member, a linear adjusting assembly and an universal connecting assembly;

wherein the double spherical head lever arm comprises a hollow arm body, a small spherical head sleeve and a large spherical head sleeve arranged coaxially, and the small spherical head sleeve and the large spherical head sleeve are respectively arranged at and communicate with two ends of the hollow arm body;

the linear adjusting assembly comprises a plurality of linear adjusting mechanisms configured for adjusting a position of the small spherical head sleeve along a linear direction; an end of the elastic member and ends of the plurality of linear adjusting mechanisms are abutted against an outer surface of the small spherical head sleeve, the elastic member and the plurality of linear adjusting mechanisms are arranged along a circumferential direction of the small spherical head sleeve; and a direction of a resultant force of the plurality of linear adjusting mechanisms is collinear with a direction of an elastic force of the elastic member; and the universal connecting assembly comprises an universal connecting ring and a plurality of positioning balls, an inner wall of the universal connecting ring is provided with an annular spherical surface matching the large spherical head sleeve, the large spherical head sleeve is inserted in an inside of the universal connecting ring and is fitted with the annular spherical surface; the universal connecting ring is circumferentially provided with a plurality of positioning holes corresponding to the plurality of positioning balls one by one; each of the plurality of positioning balls is inserted in a corresponding one of the plurality of positioning holes; and the plurality of positioning balls are arranged to abut against an outer surface of the large spherical head sleeve.

2. The universally adjustable precision lever structure according to claim 1, wherein the plurality of linear adjusting mechanisms comprises two linear adjusting mechanisms, the elastic member and the two linear adjusting mechanisms are arranged along a radial direction of the small spherical head sleeve, the two linear adjusting mechanisms are perpendicular to each other, and an angle between the elastic member and each of the two linear adjusting mechanisms is 135 degrees.

3. The universally adjustable precision lever structure according to claim 1, wherein the plurality of linear adjusting mechanisms are adjusting screws.

4. The universally adjustable precision lever structure according to claim 1, wherein the elastic member is a spring.

5. The universally adjustable precision lever structure according to claim 1, wherein a number of the plurality of positioning balls is greater than or equal to 6, and less than or equal to 20, and the number of the plurality of positioning balls is an even number.

6. A photoelectric product, comprising a mounting shell and the universally adjustable precision lever structure, wherein the universally adjustable precision lever structure comprises a double spherical head lever arm, an elastic member, a linear adjusting assembly and an universal connecting assembly;

wherein the double spherical head lever arm comprises a hollow arm body, a small spherical head sleeve and a large spherical head sleeve arranged coaxially, and the small spherical head sleeve and the large spherical head sleeve are respectively arranged at and communicate with two ends of the hollow arm body;

the linear adjusting assembly comprises a plurality of linear adjusting mechanisms configured for adjusting a position of the small spherical head sleeve along a linear direction; an end of the elastic member and ends of the plurality of linear adjusting mechanisms are abutted against an outer surface of the small spherical head sleeve, the elastic member and the plurality of linear adjusting mechanisms are arranged along a circumferential direction of the small spherical head sleeve; and a direction of a resultant force of the plurality of linear adjusting mechanisms is collinear with a direction of an elastic force of the elastic member; and the universal connecting assembly comprises an universal connecting ring and a plurality of positioning balls, an inner wall of the universal connecting ring is provided with an annular spherical surface matching the large spherical head sleeve, the large spherical head sleeve is inserted in an inside of the universal connecting ring and is fitted with the annular spherical surface; the universal connecting ring is circumferentially provided with a plurality of positioning holes corresponding to the plurality of positioning balls one by one; each of the plurality of positioning balls is inserted in a corresponding one of the plurality of positioning holes; and the plurality of positioning balls are arranged to abut against an outer surface of the large spherical head sleeve;

wherein the universally adjustable precision lever structure is arranged in the mounting shell, a first mounting hole and a plurality of second mounting holes are circumferentially arranged in an inner wall of the mounting shell; the elastic member is arranged in the first mounting hole, the plurality of second mounting holes correspond to the plurality of linear adjusting mechanisms one by one; and each of the plurality of linear adjusting mechanisms is arranged in a corresponding one of the plurality of second mounting holes.

7. The photoelectric product according to claim 6, further comprising a limiting pressure ring, wherein a first limiting step configured for positioning the universal connecting ring and a second limiting step configured for positioning the limiting pressure ring are arranged at an end of the mounting shell that is close to the large spherical head sleeve; the first limiting step and the second limiting step are arranged in a stepped manner; a first end of the universal connecting ring is arranged to be opposite to the first limiting step, a second end of the universal connecting ring is arranged to abut against the limiting pressure ring, and an end of the limiting pressure ring that is close to the universal connecting ring is arranged to be opposite to the second limiting step.

8. The photoelectric product according to claim 6, wherein the plurality of linear adjusting mechanisms comprises two linear adjusting mechanisms, the elastic member and the two linear adjusting mechanisms are arranged along a radial direction of the small spherical head sleeve, the two linear adjusting mechanisms are perpendicular to each other, and an angle between the elastic member and each of the two linear adjusting mechanisms is 135 degrees.

9. The photoelectric product according to claim 6, wherein the plurality of linear adjusting mechanisms are adjusting screws.

10. The photoelectric product according to claim 6, wherein the elastic member is a spring.

11. The photoelectric product according to claim 6, wherein a number of the plurality of positioning balls is greater than or equal to 6, and less than or equal to 20, and the number of the plurality of positioning balls is an even number.

* * * * *